US009834339B2

(12) United States Patent
Brucker et al.

(10) Patent No.: US 9,834,339 B2
(45) Date of Patent: Dec. 5, 2017

(54) LAMINATE STRUCTURE TO STABILIZE A DIMENSIONALLY UNSTABLE LAYER

(75) Inventors: Steven A. Brucker, Gibson City, IL (US); Eric Clark, Normal, IL (US)

(73) Assignee: Selig Sealing Products, Inc., Forrest, IL (US)

(*) Notice: Subject to any disclaimer, the term of this patent is extended or adjusted under 35 U.S.C. 154(b) by 956 days.

(21) Appl. No.: 14/008,363

(22) PCT Filed: Mar. 28, 2012

(86) PCT No.: PCT/US2012/030962
§ 371 (c)(1),
(2), (4) Date: Feb. 10, 2014

(87) PCT Pub. No.: WO2012/135353
PCT Pub. Date: Oct. 4, 2012

(65) Prior Publication Data
US 2014/0158691 A1 Jun. 12, 2014

Related U.S. Application Data

(60) Provisional application No. 61/468,257, filed on Mar. 28, 2011.

(51) Int. Cl.
*B32B 29/00* (2006.01)
*B32B 27/00* (2006.01)
*B32B 15/00* (2006.01)
*B32B 7/02* (2006.01)
*B32B 27/10* (2006.01)
*B32B 15/12* (2006.01)
*B32B 15/08* (2006.01)
*B65D 41/00* (2006.01)
*B32B 27/36* (2006.01)

(52) U.S. Cl.
CPC .............. *B65D 41/005* (2013.01); *B32B 7/02* (2013.01); *B32B 15/00* (2013.01); *B32B 15/08* (2013.01); *B32B 15/12* (2013.01); *B32B 27/00* (2013.01); *B32B 27/10* (2013.01); *B32B 27/36* (2013.01); *B32B 29/00* (2013.01); *B32B 29/002* (2013.01); *B32B 2307/31* (2013.01); *B32B 2307/734* (2013.01); *B32B 2435/02* (2013.01); *B32B 2439/00* (2013.01); *Y10T 428/2495* (2015.01); *Y10T 428/24967* (2015.01); *Y10T 428/2817* (2015.01)

(58) Field of Classification Search
None
See application file for complete search history.

(56) References Cited

U.S. PATENT DOCUMENTS

| | | |
|---|---|---|
| 3,235,165 A | 2/1966 | Jackson |
| 3,292,828 A | 12/1966 | Stuart |
| 3,302,818 A | 2/1967 | Balocca et al. |
| 3,990,603 A | 11/1976 | Brochman |
| 4,206,165 A | 6/1980 | Dukess |
| 4,254,173 A * | 3/1981 | Peer, Jr. .................... B31B 1/88 206/158 |
| 4,735,335 A | 4/1988 | Torterotot |
| 4,741,791 A | 5/1988 | Howard et al. |
| 4,770,325 A | 9/1988 | Gordon et al. |
| 4,837,061 A | 6/1989 | Smits et al. |
| 4,960,216 A | 10/1990 | Giles et al. |
| 4,961,986 A | 10/1990 | Galda |
| 5,004,111 A | 4/1991 | McCarthy |
| 5,015,318 A | 5/1991 | Smits et al. |
| 5,055,150 A | 10/1991 | Rosenfeld et al. |
| 5,057,365 A | 10/1991 | Finkelstein et al. |
| 5,071,710 A | 12/1991 | Smits et al. |
| 5,098,495 A | 3/1992 | Smits et al. |
| RE33,893 E | 4/1992 | Elias et al. |
| 5,125,529 A | 6/1992 | Torterotot |
| 5,149,386 A | 9/1992 | Smits et al. |
| 5,178,967 A | 1/1993 | Rosenfeld et al. |
| 5,197,618 A | 3/1993 | Goth |
| 5,265,745 A | 11/1993 | Pereyra et al. |
| 5,433,992 A | 7/1995 | Galda et al. |
| 5,513,781 A | 5/1996 | Ullrich et al. |
| 5,514,442 A | 5/1996 | Galda et al. |
| 5,598,940 A | 2/1997 | Finkelstein et al. |
| 5,601,200 A | 2/1997 | Finkelstein et al. |
| 5,615,789 A | 4/1997 | Finkelstein et al. |
| 5,669,521 A | 9/1997 | Wiening et al. |
| 5,702,015 A | 12/1997 | Giles et al. |
| 5,860,544 A * | 1/1999 | Brucker ................ B65D 51/20 215/232 |
| 5,871,112 A | 2/1999 | Giles |
| 5,915,577 A | 6/1999 | Levine |
| 5,975,304 A | 11/1999 | Cain et al. |

(Continued)

FOREIGN PATENT DOCUMENTS

| | | |
|---|---|---|
| AT | 501 393 A1 | 8/2006 |
| AT | 11 738 U1 | 4/2011 |

(Continued)

OTHER PUBLICATIONS

PCT International Search Report and Written Opinion of the International Searching Authority for International Application No. PCT/US2012/030962 dated Jul. 20, 2012, 8 pages.

*Primary Examiner* — Sheeba Ahmed
(74) *Attorney, Agent, or Firm* — Fitch, Even, Tabin & Flannery LLP

(57) ABSTRACT

A seal laminate for closing a mouth of a container is provided. The seal laminate includes a heat seal layer, a structural base support layer and upper and lower dimensional stable layers. The heat seal layer bonds the laminate to a rim surrounding the container's mouth. The structural base support layer may be comprised of a pulp, paper, cardboard, chipboard, paperboard, or cellulose based material having a moisture content of about 3 to about 6 percent and is positioned above the heat seal layer. The upper and lower dimensionally stable layers are disposed above and below the structural base support layer and are sized to balance the vertical forces on the structural base support layer upon exposure to about 60 percent or greater relative humidity. The upper and lower dimensionally stable layers have a water vapor transmission rate of about 1.5 g/100 in$^2$/24 hours or below.

18 Claims, 2 Drawing Sheets

(56) References Cited

U.S. PATENT DOCUMENTS

| | | |
|---|---|---|
| 6,082,566 A | 7/2000 | Yousif et al. |
| 6,131,754 A | 10/2000 | Smelko |
| 6,139,931 A | 10/2000 | Finkelstein et al. |
| 6,158,632 A | 12/2000 | Ekkert |
| 6,194,042 B1 | 2/2001 | Finkelstein et al. |
| 6,309,504 B1 | 10/2001 | Langan |
| 6,312,776 B1 | 11/2001 | Finkelstein et al. |
| 6,378,715 B1 | 4/2002 | Finkelstein et al. |
| 6,458,302 B1 | 10/2002 | Shifflet |
| 6,468,708 B1 | 10/2002 | Wang et al. |
| 6,602,309 B2 | 8/2003 | Vizulis et al. |
| 6,627,273 B2 | 9/2003 | Wolf et al. |
| 6,699,566 B2 | 3/2004 | Zeiter et al. |
| 6,705,467 B1 | 3/2004 | Kancsar et al. |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko et al. |
| 6,902,075 B2 | 6/2005 | O'Brien et al. |
| 6,916,516 B1 | 7/2005 | Gerber et al. |
| 6,955,736 B2 | 10/2005 | Rosenberger et al. |
| 6,974,045 B1 | 12/2005 | Trombach et al. |
| 7,128,210 B2 | 10/2006 | Razeti et al. |
| 7,182,475 B2 | 2/2007 | Kramer et al. |
| 7,217,454 B2 | 5/2007 | Smelko et al. |
| RE39,790 E | 8/2007 | Fuchs et al. |
| 7,316,760 B2 | 1/2008 | Nageli |
| 7,448,153 B2 | 11/2008 | Maliner et al. |
| 7,531,228 B2 | 5/2009 | Perre et al. |
| 7,648,764 B2 | 1/2010 | Yousif |
| 7,713,605 B2 | 5/2010 | Yousif et al. |
| 7,740,730 B2 | 6/2010 | Schedl et al. |
| 7,740,927 B2 | 6/2010 | Yousif et al. |
| 7,819,266 B2 | 10/2010 | Ross et al. |
| 7,838,109 B2 | 11/2010 | Declerck |
| 7,850,033 B2 | 12/2010 | Thorstensen-Woll |
| 8,057,896 B2 | 11/2011 | Smelko et al. |
| 8,329,288 B2 | 12/2012 | Allegaert et al. |
| 8,348,082 B2 | 1/2013 | Cain |
| 2002/0068140 A1 | 6/2002 | Finkelstein et al. |
| 2003/0168423 A1 | 9/2003 | Williams |
| 2003/0196418 A1 | 10/2003 | O'Brien et al. |
| 2004/0109963 A1 | 6/2004 | Zaggia et al. |
| 2005/0048307 A1 | 3/2005 | Schubert et al. |
| 2006/0000545 A1 | 1/2006 | Nageli et al. |
| 2006/0003120 A1 | 1/2006 | Nageli et al. |
| 2006/0003122 A1 | 1/2006 | Nageli et al. |
| 2006/0151415 A1 | 7/2006 | Smelko et al. |
| 2006/0278665 A1 | 12/2006 | Bennett |
| 2007/0003725 A1 | 1/2007 | Yousif |
| 2007/0087212 A1 | 4/2007 | Iyengar et al. |
| 2007/0267304 A1 | 11/2007 | Portier |
| 2007/0298273 A1 | 12/2007 | Thies et al. |
| 2008/0026171 A1 | 1/2008 | Gullick et al. |
| 2008/0073308 A1 | 3/2008 | Yousif |
| 2008/0103262 A1 | 5/2008 | Haschke |
| 2008/0156443 A1 | 7/2008 | Schaefer et al. |
| 2008/0169286 A1 | 7/2008 | McLean et al. |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll et al. |
| 2009/0004505 A1* | 1/2009 | Carespodi ............ B32B 37/12 428/624 |
| 2009/0057326 A1 | 3/2009 | Opitz |
| 2009/0078671 A1 | 3/2009 | Triquet et al. |
| 2009/0208729 A1 | 8/2009 | Allegaert et al. |
| 2009/0304964 A1 | 12/2009 | Sachs et al. |
| 2010/0009162 A1 | 1/2010 | Rothweiler |
| 2010/0030180 A1 | 2/2010 | Declerck |
| 2010/0047552 A1 | 2/2010 | McLean et al. |
| 2010/0059942 A1 | 3/2010 | Rothweiler |
| 2010/0116410 A1 | 5/2010 | Yousif |
| 2010/0155288 A1 | 6/2010 | Harper et al. |
| 2010/0170820 A1 | 7/2010 | Leplatois et al. |
| 2010/0193463 A1 | 8/2010 | O'Brien et al. |
| 2010/0201082 A1 | 8/2010 | Hart |
| 2010/0213193 A1 | 8/2010 | Helmlinger et al. |
| 2010/0221483 A1 | 9/2010 | Gonzalez Carro et al. |
| 2010/0290663 A1 | 11/2010 | Trassl et al. |
| 2010/0314278 A1 | 12/2010 | Fonteyne et al. |
| 2011/0000917 A1 | 1/2011 | Wolters et al. |
| 2011/0005961 A1 | 1/2011 | Leplatois et al. |
| 2011/0089177 A1 | 4/2011 | Thorstensen-Woll |
| 2011/0091715 A1 | 4/2011 | Rakutt et al. |
| 2011/0100949 A1 | 5/2011 | Grayer et al. |
| 2011/0100989 A1 | 5/2011 | Cain |
| 2011/0138742 A1 | 6/2011 | McLean |
| 2011/0147353 A1 | 6/2011 | Kornfeld et al. |
| 2012/0000910 A1 | 1/2012 | Ekkert |
| 2012/0043330 A1 | 2/2012 | McLean et al. |
| 2012/0103988 A1 | 5/2012 | Wiening |
| 2012/0241449 A1 | 9/2012 | Frischmann et al. |

FOREIGN PATENT DOCUMENTS

| | | |
|---|---|---|
| BR | 8200231 U | 9/2003 |
| BR | 0300992 A | 11/2004 |
| CA | 2 015 992 A1 | 1/1991 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 668 221 A1 | 8/1995 |
| EP | 0 826 598 A2 | 3/1998 |
| EP | 0 826 599 A2 | 3/1998 |
| EP | 0 717 710 B1 | 4/1999 |
| EP | 0 915 026 A1 | 5/1999 |
| EP | 0 706 473 B1 | 8/1999 |
| EP | 0 803 445 B1 | 11/2003 |
| EP | 1 462 381 A1 | 9/2004 |
| EP | 1 577 226 A1 | 9/2005 |
| EP | 1 814 744 A1 | 8/2007 |
| EP | 1 834 893 A1 | 9/2007 |
| EP | 1 839 898 A1 | 10/2007 |
| EP | 1 839 899 A1 | 10/2007 |
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 968 020 A1 | 9/2008 |
| EP | 1 992 476 A1 | 11/2008 |
| EP | 2 230 190 A1 | 9/2010 |
| EP | 2 292 524 A1 | 3/2011 |
| FR | 2 916 157 A1 | 11/2008 |
| FR | 2 943 322 A1 | 9/2010 |
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |
| WO | 00/66450 A1 | 11/2000 |
| WO | 2006/018556 A1 | 2/2006 |
| WO | 2006/021291 A1 | 3/2006 |
| WO | 2008/027029 A2 | 3/2008 |
| WO | 2008/027036 A1 | 3/2008 |
| WO | 2008/039350 A2 | 4/2008 |
| WO | 2008/125784 A1 | 10/2008 |
| WO | 2008/125785 A1 | 10/2008 |
| WO | 2008/148176 A1 | 12/2008 |
| WO | 2009/092066 A2 | 7/2009 |
| WO | 2010/115811 A1 | 10/2010 |
| WO | 2011/039067 A1 | 4/2011 |
| WO | 2012/079971 A1 | 6/2012 |
| WO | 2012/113530 A1 | 8/2012 |
| WO | 2012/152622 A1 | 11/2012 |
| WO | 2012/172029 A1 | 12/2012 |

* cited by examiner

LAMINATE STRUCTURE TO STABILIZE A DIMENSIONALLY UNSTABLE LAYER

CROSS-REFERENCE TO RELATED APPLICATIONS

This application is a U.S. national phase application filed under 35 U.S.C. §371 of International Application PCT/US2012/030962, filed Mar. 28, 2012, designating the United States, which claims benefit of U.S. Provisional Application No. 61/468,257, filed Mar. 28, 2011, both of which are hereby incorporated herein by reference in their entirety.

FIELD

This disclosure relates to a laminate sealing member for the mouth of a container, and more particularly, to a laminate sealing member including a dimensionally unstable layer combined with one or more stabilizing layers.

BACKGROUND

One-piece induction seals typically include a membrane or foil layer combined with a heat seal layer for adhering the seal to an upper rim of a bottle or container. To support the foil and heat seal, such one-piece induction seals often include a top structural support or backing layer. The structural support is often a pulp, paper, paperboard, cardboard, chipboard, or other cellulose-type materials. This top backing layer provides a structural support for the barrier and heat seal layers of the induction seal.

In use, the one-piece induction seals are generally die-cut from sheets into a disk shape and, then, inserted into a container or bottle cap at a closure manufacture. The cap generally includes internal threading or other internal retention projections that hold the seal against the upper surface of the cap by friction or interference. The cap and seal combination may then be provided to an end user where the seal is induction sealed to the upper rim of a bottle or container when the cap is placed thereon after the container is filled with a product.

During periods of higher humidity, such as in the spring and summer months, the paper or pulp-based materials commonly used for the support layer tend to be susceptible to changes in the environment. When exposed to higher humidity levels, the paper or pulp-based materials tend to absorb moisture, swell, and then may deform or curl into a potato-chip like shape. If this backing curl is significant and occurs while the seal is in the cap or closure before being combined with the bottle or container, the threading or internal retention projections of the cap may not retain the seal within the cap. Due to the curling, the seal may actually fall out of the cap. In other cases, the curled seal may shift within the cap so that it can not be effectively induction sealed to the bottle during the bottle or container closing operations.

DETAILED DESCRIPTION

A one-piece, peelable sealing member or induction seal for a container is described herein. The sealing member is generally constructed from a flexible sheet or laminate and includes, in an upper portion thereof, at least one dimensionally unstable support layer that is susceptible to dimensional changes due to variations in environmental conditions. In one aspect, the sealing member includes relatively thin dimensionally stable layers bonded to upper and lower surfaces of the dimensionally unstable layer to provide enhanced dimensional stability to the seal in the presence of higher humidity. In some approaches, the combination of dimensionally stable layers above and below the unstable layers may, in some instances, provide balanced internal forces within the seal laminate structure to help retain the unstable layer in a flat configuration when exposed to higher humidity. In other approaches, the dimensionally stable layers may also exhibit a low water vapor transmission rate and/or a low oxygen transmission rate to hinder and, in some cases, prevent moisture and humidity to reach the dimensionally unstable stable layer that is sandwiched between the two stable layers above and below it. In yet other approaches, the seals described herein exhibit less than about 9.5 mm of curl, which is discussed more below, in the presence of higher humidity, which is sufficient so that the seal may be retained in a common closure or cap prior to capping operations.

As used herein, higher humidity generally refers to greater than about 60 percent relative humidity, and in some cases, about 60 percent to about 85 percent relative humidity at temperatures ranging from about 35° C. to about 50° C. As also used herein, dimensionally stable generally refers to materials that do not exhibit significant deformation or are otherwise not affected in size, shape, or thickness by variations in temperature, humidity, moisture, and the like. By one approach, as mentioned above, dimensionally stable is about 9.5 mm or less of curl. Dimensionally unstable generally refers to materials that tend to be negatively affected by environmental conditions, such as humidity and moisture, and may exhibit one or more of swelling, deformation, curling, expansion, shrinkage, and the like upon exposure to variations in environmental conditions, such as variations in humidity and moisture.

Figure 1:
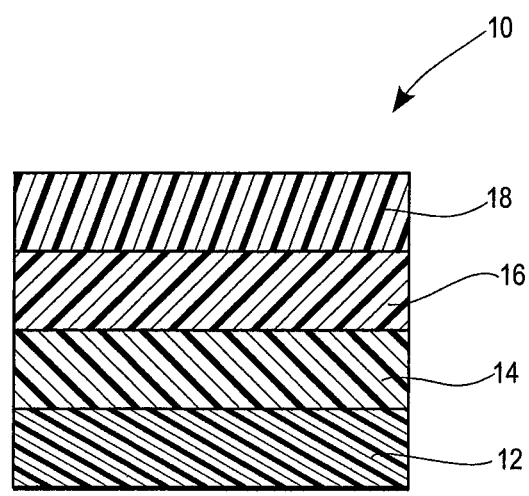
FIG. 1 is a cross-sectional view of an exemplary sealing member.

Turning to more of the specifics, FIG. 1 illustrates one example of a seal 10 showing enhanced levels of dimensional stability in the presence of variations in environmental conditions, such as exposure to higher relative humidity. Seal 10 includes a lower bonding layer 12 for bonding to the rim of a container. The lower bonding layer 12 may include a hot melt adhesive or heat seal layer for bonding or securing the liner to the container rim by a heat seal or induction sealing apparatus. Suitable heat-activated adhesives or sealants include, but are not limited to, ethylene vinyl acetate, ethylene-acrylic acid copolymers, surlyn and other suitable materials. In one approach, the lower bonding layer may be 0.5 to about 2 mils thick, and in other approaches, about 1.5 mils thick. On top of the lower bonding layer 12, the seal includes a first dimensionally stable layer 14. In this case, the first dimensionally stable layer 14 may be a metal layer or a foil layer. In one approach, the foil layer may be relatively thin, such as about 0.5 mil to about 1.5 mils thick, and in other approaches, about 1 mil thick.

Above the first dimensionally stable layer 14, the seal 10 include a dimensionally unstable structural or base layer 16. In one approach, this dimensionally unstable structural layer may be a pulp, paper, cardboard, chipboard, paperboard, or other cellulose-type layer. Base layer 16 may also include fibers or filaments. This base layer is about 5 to about 10 mils thick in one approach, and in other approaches, about 8 mils thick. By one approach, the base layer 16 is a blend of softwood and hardwood paper fibers having a moisture content of about 3 to about 6 percent that tends to be dimensionally stable at about 50 to about 55 percent relative humidity. When exposed to higher humidity as defined herein, these materials of layer 14 tend to absorb moisture. In prior seals, the paper or cardboard layer tended to exhibit undesirably high levels of deformation of about 10 mm to about 38 mm of curl in the presence of higher humidity.

To enhance the stability of seal laminates using the dimensionally unstable structural layer 16, the seal 10 also includes a second dimensionally stable layer 18 above the dimensionally unstable structural layer 16. In one approach, the second dimensionally stable layer 18 is a relatively thin layer of PET or other polymer layer having a relatively high resistance to moisture, water, and/or oxygen transmission. In another approach, the second dimensionally stable layer may be a coating of one or more polymers applied to the upper surface of the unstable layer 16 in an effective coating weight. The second dimensionally stable layer 18 may be about 0.5 to about 1.0 mils thick or a coating applied at about 6 to about 30 pounds per about 3000 square feet. By another approach, the layer 18 may be a thin and effective layer (coated or film layer) of PET (Polyethylene terephthalate), PEN (Polyethylene naphthalate), polyethylene, polypropylene, ethylene-acrylic acid copolymers, ethylene methacrylate copolymers, blends thereof, or the like materials so long as the materials are constructed in a manner and in a thickness to provide dimensional stability to the structural layer 16 as described herein when combined with the lower dimensionally stable layer 14.

In one approach, the seal 10 may also define a ratio of the thicknesses of the first and second dimensionally stable layers 14 and 18 relative to a thickness of the dimensionally unstable support layer 16 effective so that deformation of the dimensionally unstable support layer is less than about 9.5 mm of curl when exposed to about 60 to about 85 percent relative humidity. Effective ratios may be, in some cases, expressed as a thickness ratio of layer 14 to layer 16 to layer 18 of about 1:6:0.6 (thickest foil and layer 18 with thinnest backing) to about 1:20:1 (thinnest foil and layer 18 with thickest backing). Effective ratios may also be, in other approaches, expressed as a thickness of the sum of layer 14 and 18 relative to the thickness of layer 16 and range from about 1:2 to about 1:10. So constructed, the seal 10 exhibits about 0 to about 9.5 mm of curl when exposed to the higher humidity levels as defined herein, and in some cases, about 4 to about 9.5 mm of curl, and in other cases, no deformation or curling at all in the presence of higher humidity.

While not wishing to be limited by theory, it is believed that the combination of the dimensionally stable layers 14 and 18 above and below the dimensionally unstable layer 16 may have a thickness and/or composition effective to balance any vertical and/or transverse forces in the seal due to moisture absorption and swelling of the backing layer 16. This may be, in some cases, due to the layers 14 and 18 forming a sufficiently stable interface at the upper and lower perimeter edges of the backing layer 16 such that the swelling forces are balanced within the seal. The stable layers 14 and 18 also, in some cases, have water vapor transmission rates sufficient low (such as, in some cases, about 1.5 g/100 in$^2$/24 hour at 100° F. at 90% or below and, in other cases, about 1 to about 1.5) so that the stable layers 14 and 18 hinder and, in some cases, prevent moisture and humidity from reaching the unstable layer 16. The advantage of the seal constructions herein is that they provide a dimensionally stable seal while minimizing the overall seal thickness at the same time. In some approaches, the overall thickness of seal 10 is about 12 to 15 mils or less. Any thicker, the seal is cost prohibitive and undesired from a structural standpoint when used in a bottle or container closure/cap. Thus, the enhanced dimensional stability is achieved with a minimum about of materials.

In another approach, the unstable structural base layer 16 is stabilized at an interface of its upper and lower surfaces by being bonded to the upper and lower structurally stable support layers 14 and 18. Thus, the upper and lower interface and surfaces of the base layer 16, upon exposure to higher humidity (as defined herein) are stabilized and hindered from expanding in a horizontal or transverse direction.

If desired, the seal 10 may also include a pull-tab or pull-tab portion. Many types of pull-tab portions may be used. Examples of pull-tabs suitable for the seal 10 include those as described in U.S. Pat. No. 5,433,992; U.S. Pat. No. 5,514,442; U.S. Pat. No. 5,004,111; U.S. Pat. No. 6,866,926; U.S. Pat. No. 6,902,075; U.S. Pat. No. 7,217,454; US 2006/0151415; and US 2008/0233339. Each of these patents and publications are incorporated herein by reference in their entirety. In general, the pull-tab may be defined wholly within a perimeter of the sealing member or laminate.

Advantages and embodiments of the seal and the dimensional stability described herein are further illustrated by the following example; however, the particular conditions, processing schemes, materials, and amounts thereof recited in this example, as well as other conditions and details, should not be construed to unduly limit the seals as described herein. All percentages are by weight unless otherwise indicated.

EXAMPLES

Example 1

A dimensionally stable seal having a 0.5 mil PET layer bonded to a 8 mil backing with a 1 mil foil and 1.5 mil heat seal layer under the backing was evaluated for curl (identified as TR seal below). A comparative or base seal having the same 8 mil backing, 1 mil foil, and 1.5 mil heat seal, but no upper PET layer was also evaluated for curl (identified as BR seal below).

Figure 2:
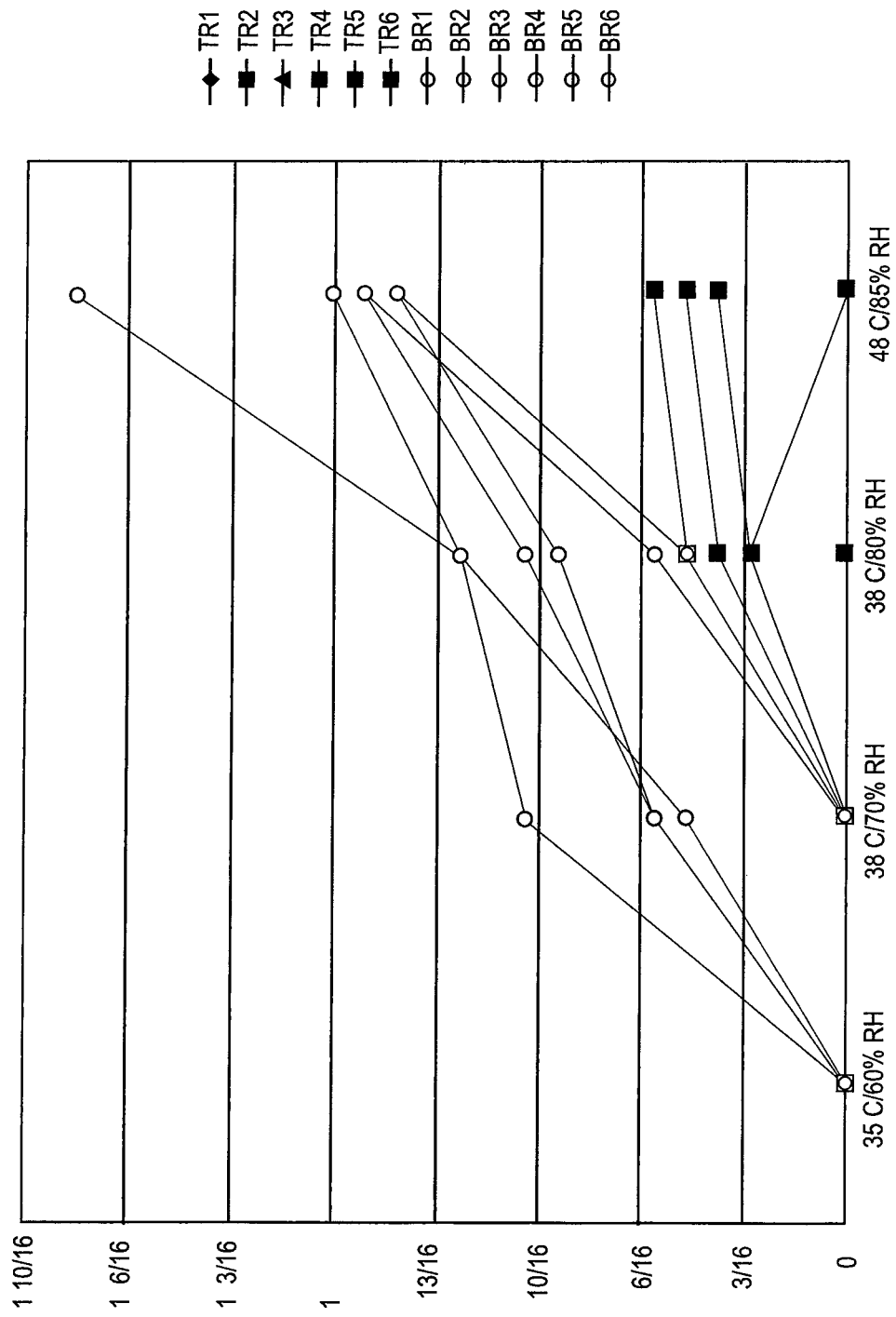
FIG. 2 is a graph showing the dimensional stability of the laminates herein.

Curl was determined by cutting an 89 mm disk of the material and placing it on a flat surface in a humidity chamber. Curl was determined by measuring the distance an outer perimeter of the disk raised above the flat surface in the chamber. The degree of curl is shown in Tables 1 and 2 below. Table 1 shows the results of 6 different trials of the same dimensionally stable inner seal (labeled as TR 1-6 in the Table and Figure). Table 2 shows the results of 6 different comparative seals that do not demonstrate dimensional stability in the presence of higher humidity (Labeled as BR 1-6 in the Table and Figure). FIG. 2 shows the results of this study graphically.

TABLE 1

Dimensionally stable inner seals

| Temp | Humidity | TR1 | TR2 | TR3 | TR4 | TR5 | TR6 |
|---|---|---|---|---|---|---|---|
| 35° C. | 60% | 0 | 0 | 0 | 0 | 0 | 0 |
| 38° C. | 70% | 0 | 0 | 0 | 0 | 0 | 0 |
| 38° C. | 80% | 0 | 4/16 | 3/16 | 5/16 | 3/16 | 0 |
| 48° C. | 85% | 0 | 5/16 | 0 | 6/16 | 4/16 | 0 |

Level of Curl, Inches

TABLE 2

Comparison dimensionally unstable inner seals

| | | Level of Curl, Inches | | | | | |
|---|---|---|---|---|---|---|---|
| Temp | Humidity | BR1 | BR2 | BR3 | BR4 | BR5 | BR6 |
| 35° C. | 60% | 0 | 0 | 0 | 0 | 0 | 0 |
| 38° C. | 70% | 0 | 6/16 | 0 | 10/16 | 5/16 | 6/16 |
| 38° C. | 80% | 5/16 | 9/16 | 6/16 | 12/16 | 12/16 | 10/16 |
| 48° C. | 85% | 14/16 | 14/16 | 15/16 | 18/16 | 1 | 15/16 |

It will be understood that various changes in the details, materials, and arrangements of the seal laminate, which have been herein described and illustrated in order to explain the nature of the seals described herein, may be made by those skilled in the art within the principle and scope of the embodied description.

What is claimed is:

1. A seal laminate having dimensional stability in high humidity and for closing a mouth of a container, the dimensionally stable seal laminate comprising:
    a heat seal layer having an upper surface thereof, the heat seal layer for bonding the seal laminate to a rim surrounding the container's mouth;
    a structural support layer having upper and lower surfaces thereof and positioned above and extending across the entire upper surface of the heat seal layer, the structural support layer including materials selected from the group consisting of pulp, paper, cardboard, chipboard, paperboard, cellulose based material, and mixtures thereof and including one of softwood fibers, hardwood fibers, and blends thereof with a moisture content of about 3 to about 6 percent at about 50 to about 55 percent relative humidity;
    upper and lower dimensionally stable layers directly bonded to the structural support layer on the upper and lower surfaces thereof, the upper and lower dimensionally stable layers each having a water vapor transmission rate of no more than about 1.5 g/100 in$^2$/24 hours, the upper dimensionally stable layer being a polymer layer comprising at least one polymer in the form of a coating that is applied at about 6 to about 30 pounds per 3000 square feet; and
    a ratio of a total thickness of the sum of the upper and lower dimensionally stable layers to a thickness of the structural support layer from about 1:2 to about 1:10 such that the upper and lower dimensionally stable layers directed bonded to the structural support layer balance the vertical forces internal to the structural support layer upon exposure to about 60 percent or greater relative humidity so that the seal laminate has a curl of less than about 9.5 mm upon exposure to humidity of about 60 percent or greater.

2. The seal laminate of claim 1, wherein the total thickness of the seal laminate is no greater than 15 mils thick and wherein the heat seal layer has a thickness of about 0.5 to about 2 mils, the structural support layer has a thickness of about 5 to about 10 mils, the upper dimensionally stable layer has a thickness of about 0.5 to about 1 mil, and the lower dimensionally stable layer has a thickness of about 0.5 to about 1.5 mils.

3. The seal laminate of claim 1, wherein the upper dimensionally stable layer is selected from the group consisting of polyethylene terephthalate, polyethylene naphthalate, polyethylene, polypropylene, ethylene-acrylic acid copolymers, ethylene methacrylate copolymers and blends thereof.

4. The seal laminate of claim 1, wherein the water vapor transmission rate is about 1 to about 1.5 g/100 in$^2$/24 hours.

5. The seal laminate of claim 1, wherein the lower dimensionally stable layer is selected from the group consisting of a metal layer and a foil layer.

6. The seal laminate of claim 1, wherein the laminate has a ratio of a thickness of the lower dimensionally stable layer to a thickness of the structural support layer to a thickness of the upper dimensionally stable layer of from about 1:6:0.6 to about 1:20:1.

7. The seal laminate of claim 2, further comprising a pull tab, the pull tab being positioned entirely with a perimeter of the seal laminate.

8. A seal laminate for closing a mouth of a container comprising:
    a heat seal layer having an upper surface and for bonding the seal laminate to a rim surrounding the container's mouth;
    a structural support layer of a pulp, paper, cardboard, chipboard, paperboard, or cellulose based material having a moisture content of about 3 to about 6 percent positioned above and extending across the entire upper surface of the heat seal layer;
    upper and lower dimensionally stable layers disposed above and below the structural support layer sized to balance the vertical forces on the structural support layer upon exposure to about 60 percent or greater relative humidity; and
    the upper and lower dimensionally stable layers having a water vapor transmission rate of about 1.5 g/100 in$^2$/24 hours or below, the upper dimensionally stable layer being a polymer layer comprising at least one polymer,
    wherein the heat seal layer has a thickness of about 0.5 to about 2 mil, the structural support layer has a thickness of about 5 to about 10 mil, the upper dimensionally stable layer has a thickness of about 0.5 to about 1 mil, and the lower dimensionally stable layer has a thickness of about 0.5 to about 1.5 mil.

9. The seal laminate of claim 8, wherein the heat seal layer is selected from the group consisting of ethylene vinyl acetate, ethylene-acrylic acid copolymers, surlyn and blends thereof.

10. The seal laminate of claim 8, wherein the upper dimensionally stable layer is selected from the group consisting of polyethylene terephthalate, polyethylene naphthalate, polyethylene, polypropylene, ethylene-acrylic acid copolymers, ethylene methacrylate copolymers and blends thereof.

11. The seal laminate of claim 8, wherein the structural support layer includes softwood and hardwood paper fibers having a moisture content of about 3 to about 6 percent and is substantially dimensionally stable at about 50 to about 55 percent relative humidity.

12. The seal laminate of claim 8, wherein the lower dimensionally stable layer is selected from the group consisting of a metal layer and a foil layer.

13. The seal laminate of claim 8, wherein the laminate has a ratio of a thickness of the lower dimensionally stable layer to a thickness of the structural support layer to a thickness of the upper dimensionally stable layer of from about 1:6:0.6 to about 1:20:1.

14. The seal laminate of claim 8, wherein the laminate has a ratio of a total thickness of the upper and lower dimensionally stable layers to a thickness of the structural support layer of from about 1:2 to about 1:10.

15. The seal laminate of claim 8, wherein the upper dimensionally stable layer is in the form of a coating that is applied at about 6 to about 30 pounds per 3000 square feet.

16. The seal laminate of claim 8, further comprising a pull tab, the pull tab being positioned entirely with a perimeter of the seal laminate.

17. The seal laminate of claim 8, wherein the structural support layer is located between and directly contacts at least a portion of each of the upper and lower dimensionally stable layers.

18. The seal laminate of claim 8, wherein the laminate exhibits less than 9.5 mm of curl when subjected to about 60 to about 90 percent relative humidity.

* * * * *